(12) United States Patent  
Galonska et al.

(10) Patent No.: US 10,506,770 B2  
(45) Date of Patent: Dec. 17, 2019

(54) PLANT GROWING SYSTEM

(71) Applicant: INFARM—INDOOR URBAN FARMING GMBH, Berlin (DE)

(72) Inventors: Guy Galonska, Berlin (DE); Erez Galonska, Berlin (DE)

(73) Assignee: INFARM—INDOOR URBAN FARMING GMBH, Berlin (DE)

( * ) Notice: Subject to any disclaimer, the term of this patent is extended or adjusted under 35 U.S.C. 154(b) by 191 days.

(21) Appl. No.: 15/502,189

(22) PCT Filed: Jul. 30, 2015

(86) PCT No.: PCT/EP2015/067595  
§ 371 (c)(1),  
(2) Date: Feb. 6, 2017

(87) PCT Pub. No.: WO2016/020272  
PCT Pub. Date: Feb. 11, 2016

(65) Prior Publication Data  
US 2017/0231175 A1    Aug. 17, 2017

Related U.S. Application Data

(60) Provisional application No. 62/033,960, filed on Aug. 6, 2014.

(51) Int. Cl.  
*A01G 31/04*   (2006.01)

(52) U.S. Cl.  
CPC ............ *A01G 31/04* (2013.01); *Y02P 60/216* (2015.11)

(58) Field of Classification Search  
CPC ..... A01G 31/04; A01G 31/042; A01G 31/047  
See application file for complete search history.

(56) References Cited

U.S. PATENT DOCUMENTS

| 8,919,040 B2 * | 12/2014 | Galvan | A01G 31/02 47/62 A |
| 2009/0265986 A1 * | 10/2009 | Young | A01G 31/02 47/62 R |
| 2013/0160360 A1 * | 6/2013 | Palmer | A01C 1/02 47/66.7 |

FOREIGN PATENT DOCUMENTS

| EP | 0 024 346 A1 | 3/1981 |
| JP | 2012-24076 A | 2/2012 |
| KR | 101376178 B1 | 3/2014 |

(Continued)

*Primary Examiner* — Kristen C Hayes  
(74) *Attorney, Agent, or Firm* — Christensen, Fonder, Dardi & Herbert PLLC

(57) ABSTRACT

A plant growing system for moving growing plants subject to positive control, the system including: a first guidance panel with a panel center and panel slots, a further guidance panel with a further guidance panel center and further guidance panel slots providing guiding tracks for a multitude of plant holding elements. The first and further guidance panels are coaxially arranged and adapted on top of each other to provide a rotational movement between each other around a common rotation axis. Plant openings for the plant holding elements are formed at intersections of the first and further guidance panel slots. Plant openings are distributed in a spiral-like pattern around the rotation axis showing a sense of rotation, wherein in the sense of rotation of the spiral-like pattern, several or all spiral-adjacent plant openings are arranged at a plant opening angle with respect to the rotation axis.

46 Claims, 13 Drawing Sheets

(56) References Cited

FOREIGN PATENT DOCUMENTS

WO      WO 87/06094 A1    10/1987
WO      WO-2018145199 A2 *   8/2018   ............... A01G 9/20

* cited by examiner

PLANT GROWING SYSTEM

RELATED APPLICATIONS

The present application is a National Phase entry of PCT Application No. PCT/EP2015/067595, filed Jul. 30, 2015, which claims priority to U.S. Provisional Application No. 62/033,960, filed Aug. 6, 2014, the disclosures of which are hereby incorporated by reference herein in their entirety.

FIELD OF THE INVENTION

The invention refers to a plant growing system for moving growing plants subject to positive control. Being subject to positive control means that the movement of the growing plants is mechanically forced to follow a defined guiding track due to structural boundary conditions.

BACKGROUND OF THE INVENTION

Such a plant growing system is known from WO 87/06094 A1. This prior art plant growing system has the following features: A first guidance panel having a first guidance panel center and first guidance panel slots extending within said first guidance panel from an area adjacent to the first guidance panel center in an outward direction, a further guidance panel with a further guidance panel center and further guidance panel slots providing guiding tracks for a multitude of plant holding elements. Wherein said first guidance panel with said first guidance panel center and said further guidance panel with said further guidance panel center are coaxially arranged and adapted on top of each other to provide a rotation movement between each other around a common rotation axis, wherein plant openings for said plant holding elements are formed at intersections of said first guidance panel slots with said further guidance panel slots. Furthermore, according to a first principle said plant openings are distributed in a spiral-like pattern around said rotation axis showing a sense of rotation, wherein in said sense of rotation of said spiral-like pattern several or all spiral-adjacent plant openings are arranged at a plant opening angle with respect to said rotation axis. As an alternative according to a second principle said plant openings are distributed in several circle-like patterns coaxially to said rotation axis, wherein on the same circle-like pattern several or all circle-adjacent plant openings are arranged at a plant opening angle with respect to said rotation axis.

SUMMARY OF THE INVENTION

It is a disadvantage of the known plant growing system that the distribution of adjacent plants showing different growing states is predetermined in a single orientation only. This structural boundary condition incurs an inefficient use of space covered by the plant growing system. Therefore, it is an object of the invention to provide a plant growing system showing an improved efficiency.

This problem is solved by a plant growing system according to embodiments described herein. According to the invention said first guidance panel slots and said further guidance panel slots are curved such that between said spiral-adjacent or between said circle-adjacent plant openings a radially-adjacent plant opening is located in a radially outward direction on a bisecting line of said plant's opening angle or deviating at an angle of less than 10 degrees, preferably less than 8 degrees and more preferably less than 6 degrees from said bisecting line.

If the claimed deviation from the bisecting line is close to zero or zero, the use of space is optimized. This is because spiral-adjacent or circle-adjacent plant openings are showing an isosceles triangular shaped arrangement with respect to the next radially adjacent plant opening in an outward direction seen from said common rotation axis. With increasing deviation from said bisecting line the triangle arrangement is more and more distorted from the perfect isosceles triangle scenario. However, the use of space in between circle-/spiral-adjacent and radially adjacent plant openings is still more efficient by claimed subject matter compared to the prior art plant growing system.

Into said plant openings plant capsules containing seeds and an initial growing substrate are plugged in. The seeds will grow roots reaching out in the environment. The plant growing system is arranged and adapted to provide nutrients to the growing plant roots by known hydroponic and/or aeroponic methods. Without being embedded in a larger piece of growing substrate, the plants may easily be displaced on their journey from seed to harvesting areas by displacing the plant capsules subject to positive control.

According to a preferred embodiment said first guidance panel slots do have a first curvature and referring back to the first principle said further guidance panel slots are formed in a continuous spiral-like shape. The feature of a spiral-like shapes comprises perfect mathematical spirals like logarithmic spirals or Archimedean spirals as well as shapes deviating from these perfect forms for instance by deformed portions or the like. As long as a curve is given that is going around a central point by increasing its distance to the central point by each revolution it is considered having a spiral-like shape.

Alternatively, referring back to the second principle said further guidance panel slots are formed as curved slots having a further curvature that extends within said further guidance panel from an area adjacent to the further guidance panel center in an outward direction, wherein said further curvature is opposite to said first curvature of said first guidance panel slots. The curvatures of the slots may both be uniform or variable.

In a preferred embodiment of said second principle the shape of one of said first guidance panel slots is mirror symmetric to the shape of one of said further guidance panel slots. Thereby, a preferred uniform distribution of plant openings in a circle pattern is provided.

In order to obtain a pattern to use space for the growing plants even more efficiently it is preferred that a majority or all of said further curvatures of said further guidance panel slots are identical.

It is advantageous that referring to the first principle said continuous spiral-like shape is adapted with regards to its curvature to the growth cycle of specific plant varieties and referring to the second principle said first curvature and said further curvature are adapted to the growth cycle of specific plant varieties. Depending on the speed of relative rotation between said first guidance panel and said further guidance panel the travel time for a plant capsule from the seeding area near the center to the harvesting area is defined. Different plant varieties (e.g. salads like Mordore, red cos, Lola Rosa and chocolate lettuce; herbs like Thai basil, Bonzai basil and wild oregano; tea herbs like Melissa, cinnamon mint, pineapple sage and Verbena; stir fry greens like Mizuna, Pak Choi, five color Swiss Chard and Turkish spinach and spicy greens like Arugula, Mizuna and Mustard) show significantly different growing dynamics. These variety specific dynamics can easily be met in an optimal way by adapting the curvature of both said first guidance panel slots and said further guidance panel slots to provide a more efficient use of interstices between plants during the growing period.

In a further preferred embodiment all of the plant opening angles have the same magnitude. Again this highly symmetric embodiment is most efficient in using the provided space for the plants. According to the same reasons it is advantageous that the plant growing system is characterized in that a majority or all of said first curvatures of said first guidance panel slots are identical. Again this feature increases symmetry and the efficient use of space for growing plants.

In order to increase flexibility in a preferred embodiment the plant growing system is characterized in that said first guidance panel and said further guidance panel are arranged in a detachable manner thereby providing the possibility to combine different guidance panels for different plant varieties. The size of the slots in the guidance panels may vary depending on the variety. Furthermore, different panels depending on the season and the sunlight related growth rate of plants may be provided.

For all above mentioned embodiments it is preferred that said first guidance panel is formed in a disc shape that is arranged and adapted to rotate around said rotation axis, wherein said further guidance panel is fastened in relation to said rotation axis. Thereby, the further guidance panel is fastened to a structure. The plant movement subject to positive control is then caused by driving the first guidance panel being formed as a disc. The rotation movement of the first guidance panel may be performed manually or with the help of a motor of a driving member. Furthermore, it is preferred that said first guidance panel has a disc circumference with a drive structure being arranged along said disc circumference and being adapted to be engaged by the driving member to rotate said first guidance panel around said rotation axis. Such a drive structure may be provided as a cogwheel structure providing mechanically robust and reliable solutions for driving the first guidance panel in form of a disc. A motorized embodiment with a driving member is advantageous as it allows a higher degree of automation for the plant growing system. However, a low-budget home-user version may come with a purely manual drive mechanism.

All above mentioned embodiments are preferably characterized by that said first guidance panel and said further guidance panel are arranged on top of a container said container being adapted to accommodate plant roots that are controlled by said plant growing system and adapted to provide said plant roots with plant nutrients and/or water. Preferably, such plant growing system according to claim 11, characterized in that said container is adapted and arranged as a hydroponic and/or aeroponic plant growing device.

Furthermore, a specifically advantageous embodiment is characterized in that said container according to the first principle shows a spiral-like channel structure with channel walls starting from a center area of said channel structure or according to the second principle shows a channel structure with several curved channels extending from a center area of said channel structure in an outward direction and being separated from each other by channel walls. The channel walls prevent that roots of radially adjacent plants do get into contact with one another what would cause stress for the plants and deteriorate growing conditions.

In another embodiment the plant growing system showing said channel structure and channel walls is characterized in that said channel structure shows an incline going upwards in a direction towards said center area of said channel structure. This incline allows the use of gravity to let water that is pumped to said central area rinse down the channel structure.

For all above described embodiments of the plant growing system having a container it is advantageous that said container comprises a control sensor device detecting parameters from the group consisting of temperature inside and outside said container, pH-value, plant fertilizer concentration and water level.

Furthermore, it is preferred that said control sensor device is adapted to control said temperature inside said container, said pH-value, said plant fertilizer concentration and said water level. This control function is achieved by a heating and/or cooling device combined with pump systems making sure that necessary amounts of water, fertilizer and pH-levelling agents are provided.

For all plant growing systems according to any of the above described embodiments it is preferred that the system comprises a horticultural lighting device for illumination of said plants arranged above said first guidance panel. Thereby, the system is independent of sunlight illumination and can be used indoors or even in areas without daylight. Furthermore, by the use of artificial light the growth rate of the plants is easier to control by the lighting device. Preferably, such lighting devices comprise Light Emitting Diodes showing an emission spectrum that is specially adapted for horticultural purposes. The manufacturer Valoya Oy from Helsinki Finland is a preferred supplier for such LEDs.

It is advantageous if said lighting device comprises a dimming device to reduce said illumination depending on the amount of solar light reaching the plant growing system. This feature helps to reduce energy costs if a combined use of illuminating device and sunlight is desirable.

If a lighting device is in use it is advantageous that said lighting device comprises a movable light source arranged and adapted to rotate around said rotation axis. In comparison to illuminating with light sources that cannot be moved with respect to the plants this embodiment in particular helps to reduce energy costs. The movable light source can be attached at a closer distance with respect to the plants. Thereby, the light yield is significantly improved.

For all plant growing system embodiments described above it is advantageous if said first guidance panel and/or said further guidance panel mainly extending in or in parallel to a common panel plane are showing portions at and around said first guidance panel center that are elevated and extend outward from said panel plane. If the diameter of the plant growing system is around 60 cm or beyond such elevated areas are easier to reach by persons operating the system.

BRIEF DESCRIPTION OF THE DRAWINGS

In the following several embodiments of the invention are described in detail referring to the corresponding figures.

DETAILED DESCRIPTION

Figure 1:
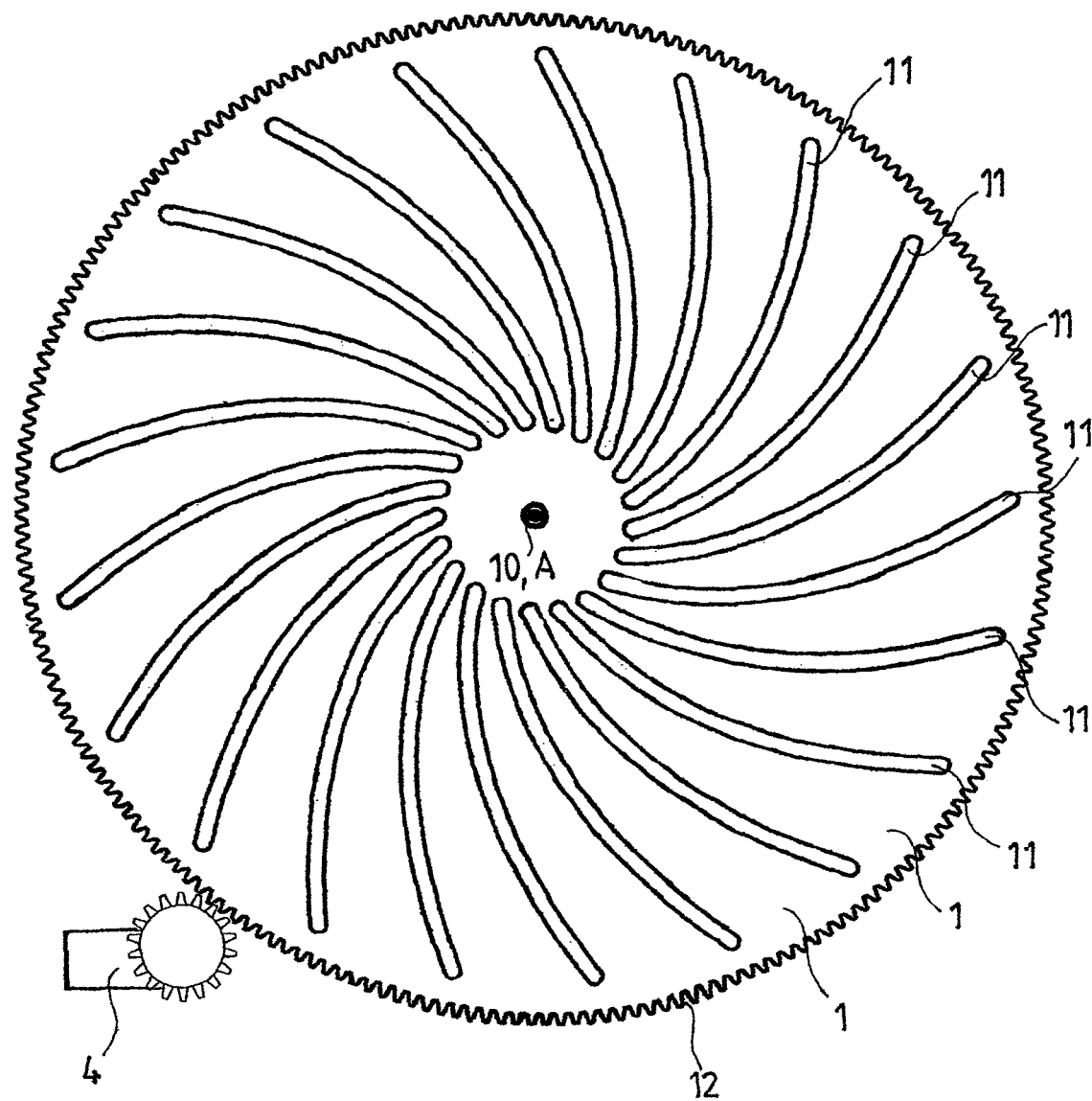
FIG. 1 schematic top view of a disc-shaped first guidance panel 1 according to a first principle of the invention.

FIG. 1 shows schematic top view of a flat disc-shaped first guidance panel 1 according to a first principle of the invention. The first guidance panel 1 having a first guidance panel center 10 with a rotation axis A running through the center, the rotation axis A being oriented perpendicular to the plane that is defined by the flat disc-shaped first guidance panel 1.

Furthermore, in the first guidance panel 1 a multitude of first guidance panel slots 11 are evenly distributed on the disc-shaped structure. These first guidance panel slots 11 are all identical showing the same curvature and each extend from an area being adjacent to the first guidance panel center 10 in the direction of the first guidance panel's circumference.

The disc-shaped first guidance panel 1 is made of suitable metal or plastics showing a drive structure 12 along its circumference. The drive structure 12 is formed as a periodic structure of indentations that is combed by a gear wheel of a driving member 4. By driving member 4 the first guidance panel is set into rotation around the rotation axis A.

Figure 2:
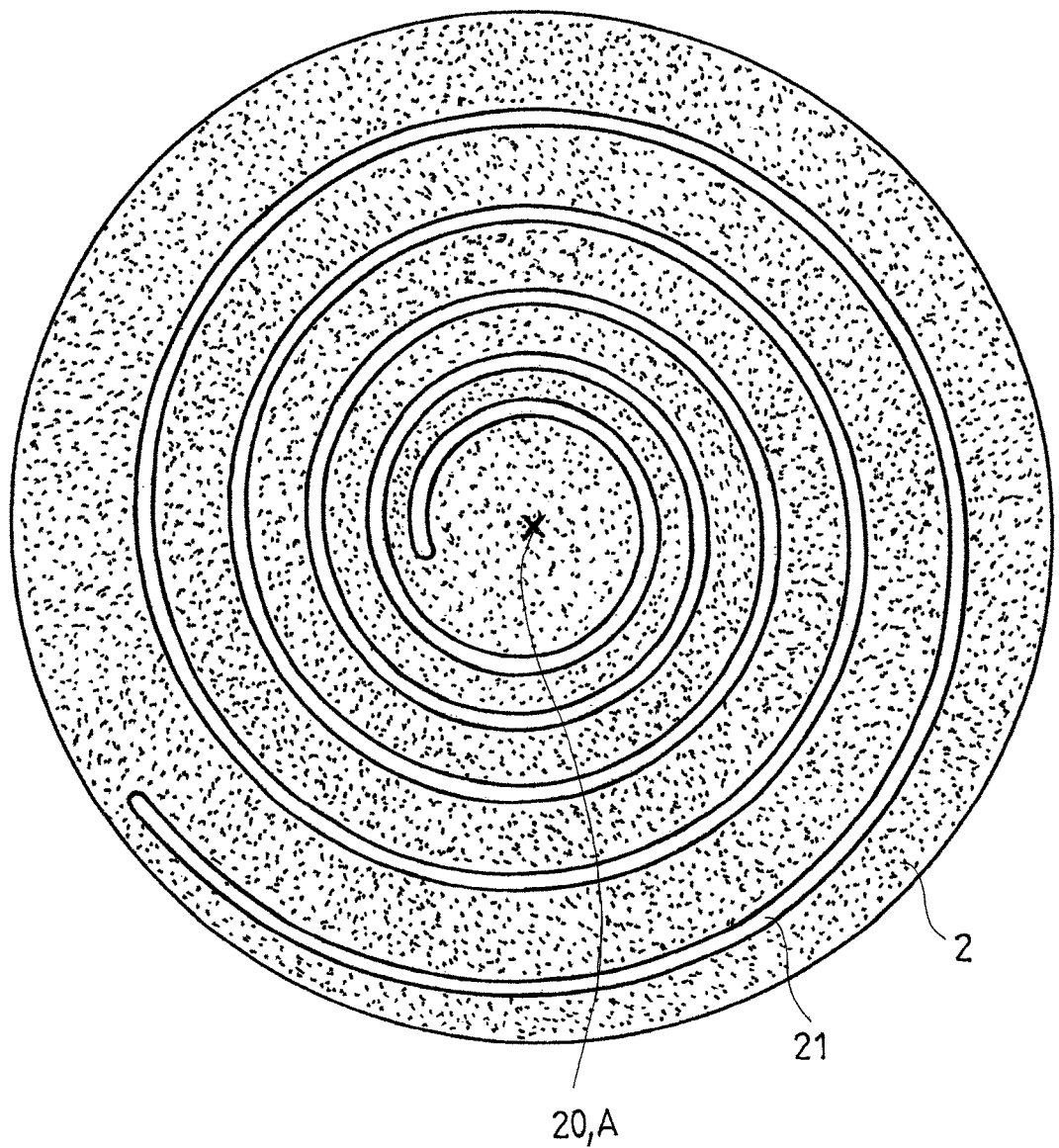
FIG. 2 schematic top view of a disc-shaped further guidance panel 2 according to a first principle of the invention.

FIG. 2 shows a schematic top view of a disc-shaped further guidance panel 2 according to a first principle of the invention. The further guidance panel 2 is having a further guidance panel center 20 with a rotational axis A running through that center perpendicular to a plane defined by the further guidance panel. Furthermore, the further guidance channel shows further guidance panel slots 21 being formed as a continuous spiral shaped slot.

Figure 3:
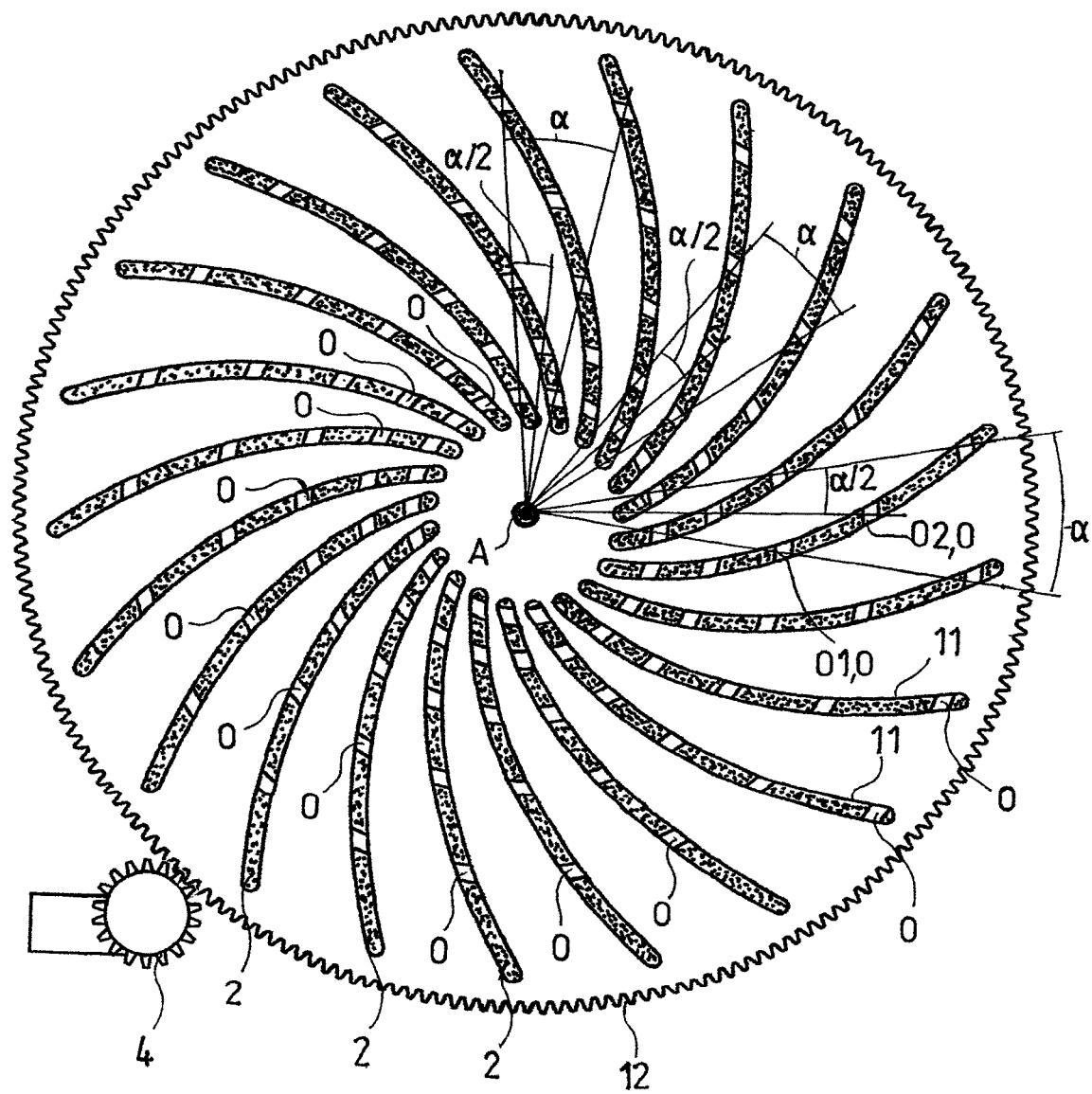
FIG. 3 schematic top view of a coaxial superposition of first guidance panel from FIG. 1 and further guidance panel from FIG. 2 the superposition showing plant openings distributed in a spiral-like pattern according to the first principle of the invention.
Figure 4:
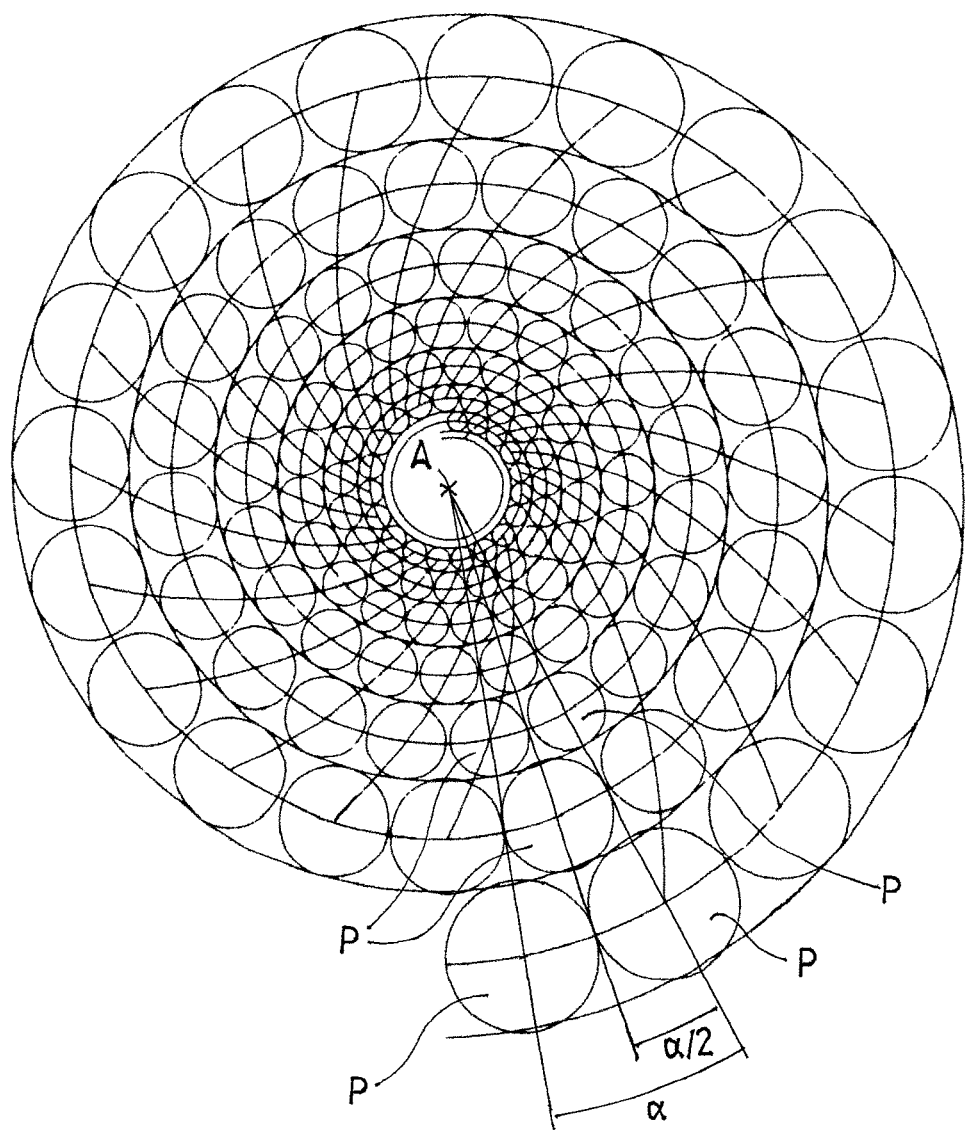
FIG. 4 schematic top view on plants being arranged according to the first principle of the invention.

FIG. 3 shows a schematic top view of a coaxial superposition of first guidance panel from FIG. 1 and further guidance panel from FIG. 2. The same reference numbers refer to the same elements with respect to FIG. 1 and FIG. 2. Therefore the according description is included without repetition. Both panels 1,2 show the same rotational axis A the superposition leads to plant openings 0 distributed in a spiral-like pattern according to the first principle of the invention. The spiral-like pattern is defined by the further guidance panel slots 21. Plant openings 0 do appear where the spiral shaped further guidance panel slots 21 are superimposed by the first guidance panel slots 11. Plant openings 0 that are adjacent to each other along the extending spiral-like pattern are so called spiral-adjacent openings 01. In view from the rotational axis A a pair of spiral-adjacent plant openings 01 are separated by a plant opening angle α. Following the bisecting line of the plant opening angle a in a radial direction the next adjacent plant opening 0 is a so called radial-adjacent plant opening 02 that is lying on bisecting line. Going further in a radial direction from a radial-adjacent plant opening 02 the enveloping legs of the plant opening angle a is running through to further radial-adjacent plant openings 01 and the a radial-adjacent plant opening 02 will follow on the bisecting line further in a radial direction. The spiral-shaped further guidance panel slots 21 are formed as a regular spiral and the first guidance panel slots 11 all showing an identical shape and curvature are evenly distributed on the disc-shaped. Therefore, all spiral-adjacent plant openings 01 are separated by the same plant opening angle α. This geometry is using interstitial space between plants that are growing along their way following the spiral-shaped further guidance panel slots what can be seen schematically in FIG. 4. FIG. 4 shows a schematic top view on plants P being arranged according to the first principle of the invention. Each circle following the spiral and having a different diameter is representing an idealized plant in a different growing phase. On each center of each circle a plant opening (not shown) is present. By the optimized use of interstitial space a much higher efficiency can be obtained on the same surface area compared to known plant growing systems. FIG. 4 shows how easily this plant growing system may be scaled up and down.

Figure 5:
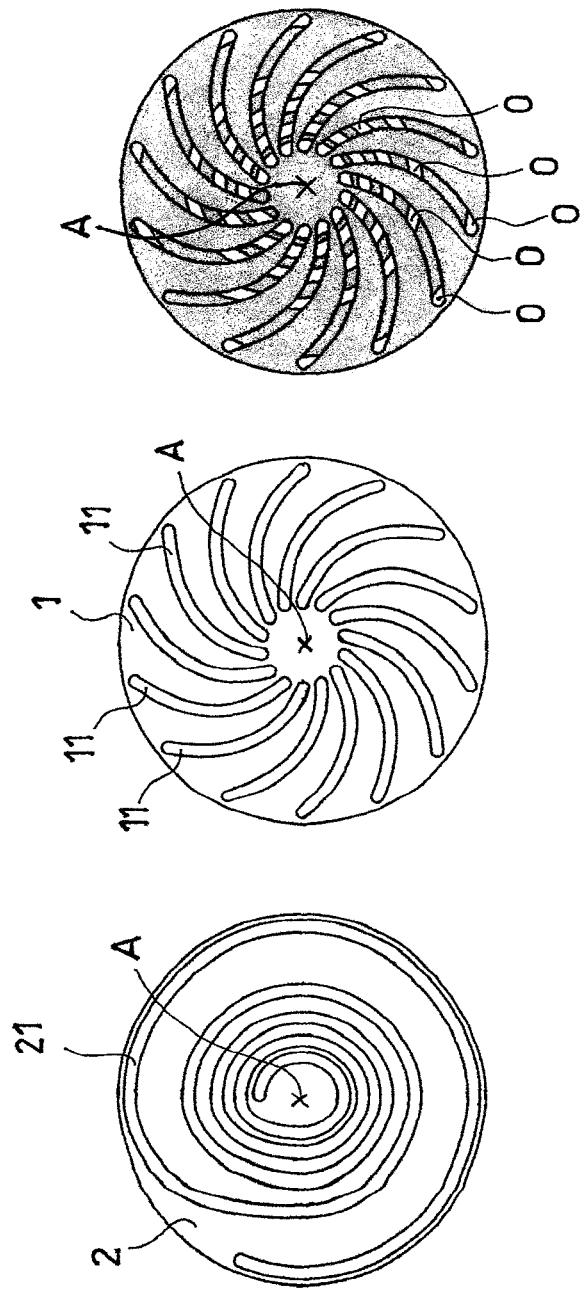
FIG. 5 first alternative embodiment for the spiral-like shape of the further guidance panel 2 together with first guidance panel 1 and a coaxial superposition of both panels according to the first principle of the invention.

FIG. 5 shows a first alternative embodiment for the spiral-like shape of the further guidance panel 2 together with the first guidance panel 1 and a coaxial superposition of both panels according to the first principle of the invention. The same reference numbers are used for the same elements. Therefore, it is referred to foregoing parts of the specification. It can be seen that unlike the spiral shape being shown in FIG. 2 these spiral-shaped further guidance panel slots 21 are not following an even path during all its way. After about four turns around the rotation axis the final section of the spiral inclines further to the circumference of the disc-shaped further guidance panel 2. Thereby the last turn of the spiral-like further guidance panel slots 21 runs close to the circumference. Thereby an easily accessible harvesting area along more than three quarters of the circumference is provided.

Figure 6:
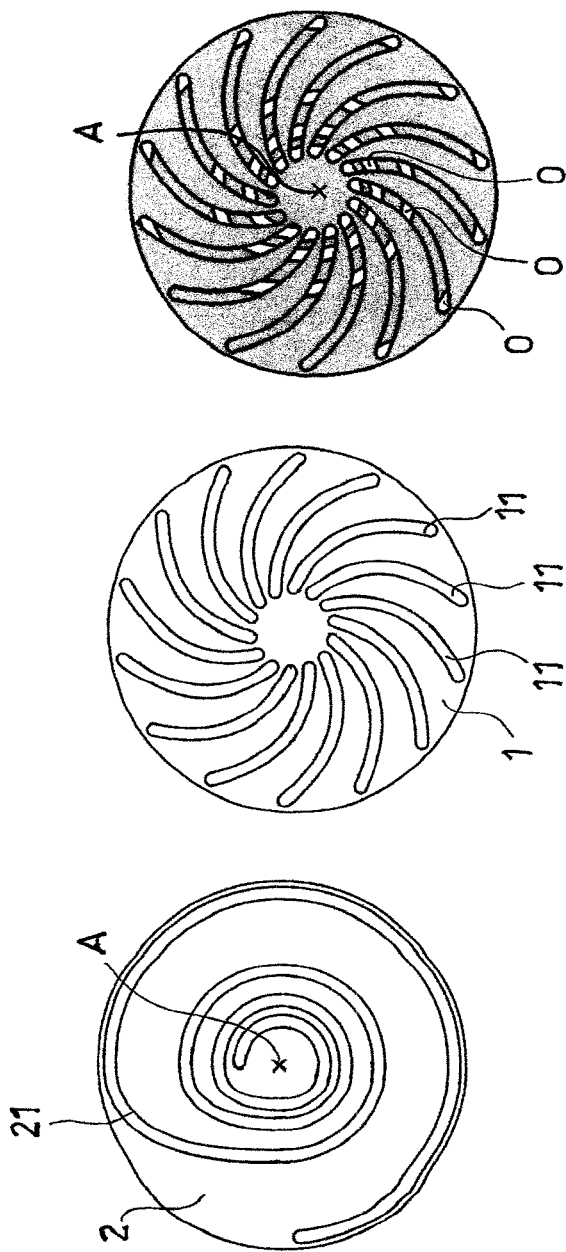
FIG. 6 second alternative embodiment for the spiral-like shape of the further guidance panel 2 together with first guidance panel 1 and a coaxial superposition of both panels according to the first principle of the invention.

FIG. 6 shows a second alternative embodiment for the spiral-like shape of the further guidance panel 2 together with first guidance panel 1 and a coaxial superposition of both panels according to the first principle of the invention. Unlike FIG. 5 the spiral-like shape of the further guidance panel slots 21 have just turned three times around rotation axis A before they enter the harvesting area close to the circumference. Depending on the growing characteristics of specific plant varieties the first guidance panel 1 and the further guidance panel 2 can be varied to obtain the needed properties on space and time during the growth of the plants.

Figure 7:
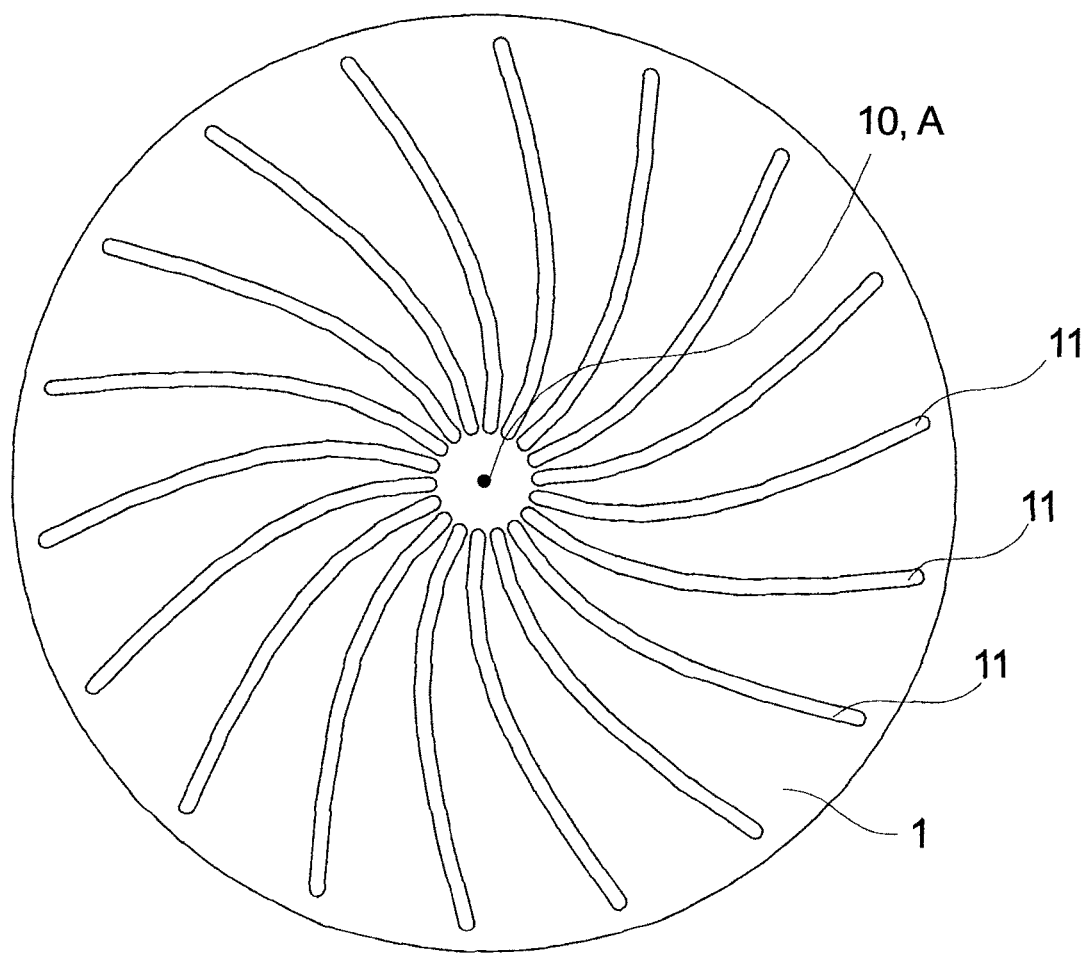
FIG. 7 schematic top view of a disc-shaped first guidance panel 1 according to a second principle of the invention.

FIG. 7 shows a schematic top view of a disc-shaped first guidance panel 1 according to a second principle of the invention. This first guidance panel 1 corresponds to the first guidance panel shown in FIG. 1. The only difference is the density of the evenly distributed first guidance panel slots.

Figure 8:
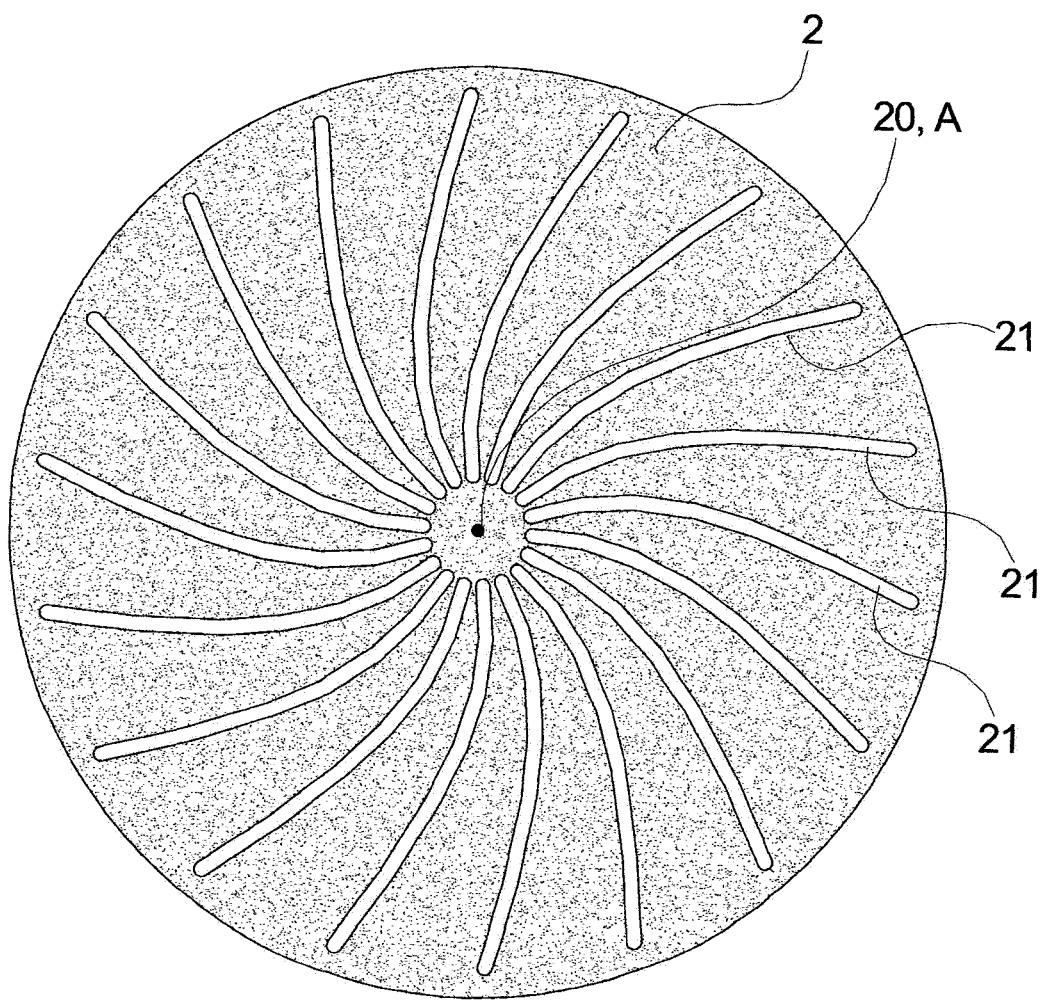
FIG. 8 schematic top view of a disc-shaped further guidance panel 1 according to a second principle of the invention.
Figure 9:
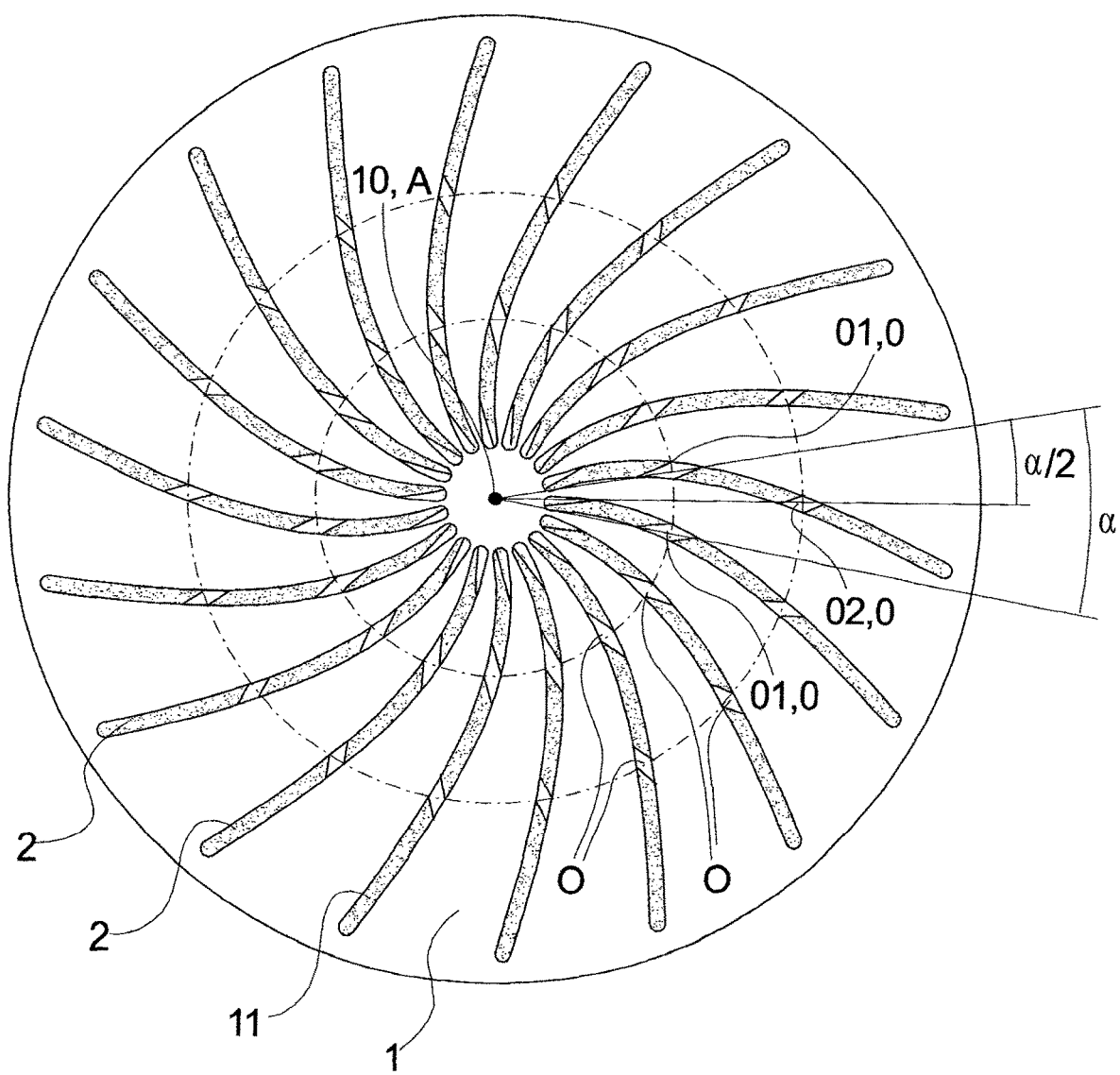
FIG. 9 schematic top view of a coaxial superposition of first guidance panel from FIG. 7 and further guidance panel from FIG. 8 the superposition showing plant openings distributed in a circle-like pattern according to the second principle of the invention.

FIG. 8 is a schematic top view of a disc-shaped further guidance panel 1 according to a second principle of the invention. The further guidance panel 2 is showing the same pattern of evenly distributed arrangement of identically curved same size slots like the first guidance panel 1 shown in FIG. 7. However, the only difference is that the sense of curvature of the further guidance panel slots 21 is opposite to the sense of curvature of the first guidance panel slots 11. FIG. 9 shows a schematic top view of a coaxial superposition of the first guidance panel 1 from FIG. 7 and the further guidance panel 2 from FIG. 8. The superposition shows plant openings 0 distributed evenly in a concentric circle-like pattern according to the second principle of the invention. Viewed from the rotation axis A the angle of circle-adjacent plant openings 01 is a plant opening angle α that is shown with its two angle legs together with the bisecting line. Starting from the bisecting line between two circle-adjacent plant openings 01 in a radial direction the bisecting line runs through a radial-adjacent plant opening 02. Unlike the first principle according to the second principle during their growth time the plants do not turn several times around the rotation axis A. The rotating superposition of the slots having opposite curvature results in a curved path for each plant on their way from the first guidance panel center 10 to the circumference. The rotation movement of the two guidance panels 1,2 is significantly smaller compared to the first plant growing system principle.

Figure 10:
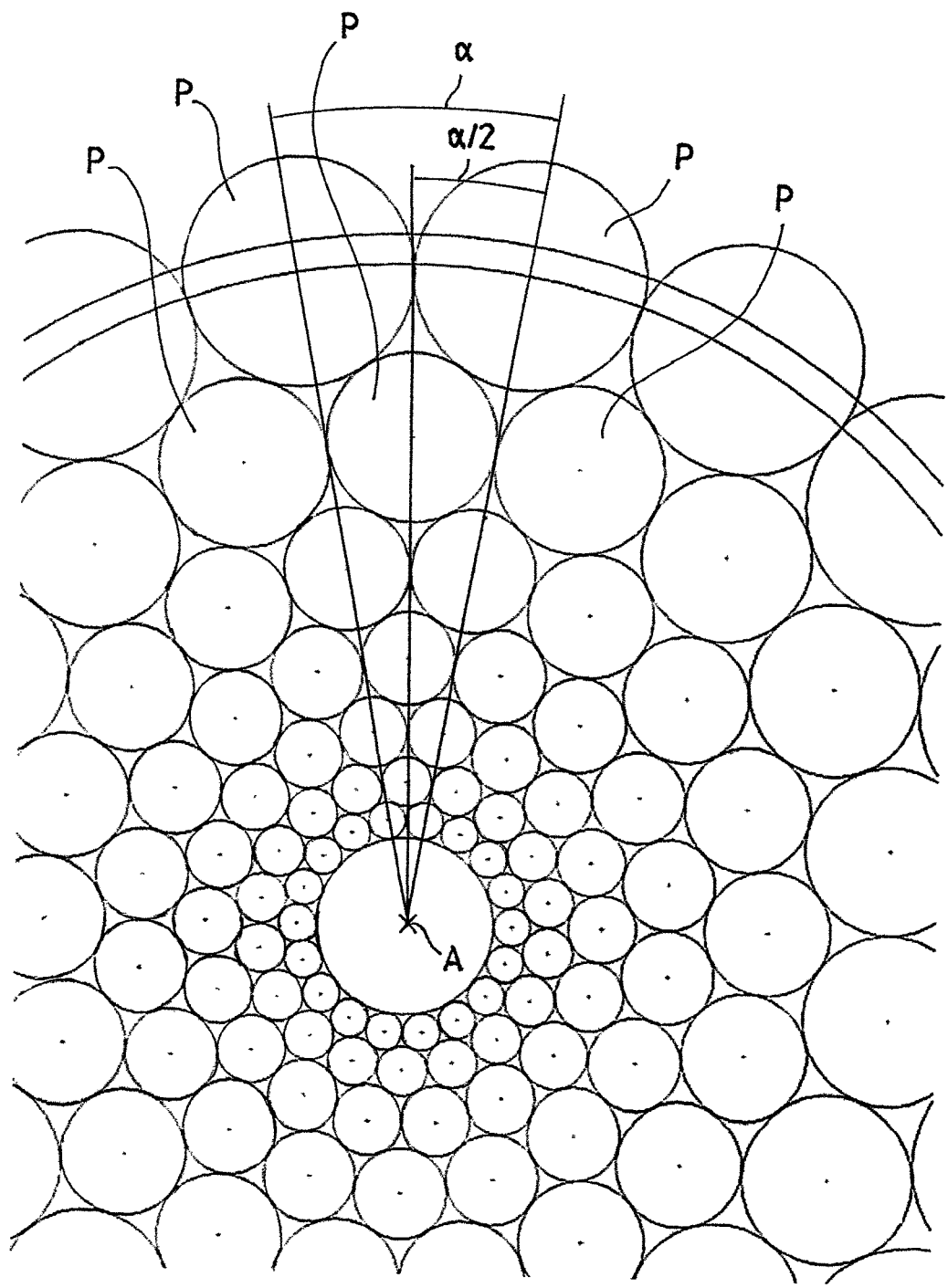
FIG. 10 schematic top view on plants being arranged according to the second principle of the invention.

FIG. 10 shows a schematic top view on plants P being arranged according to the second principle of the invention. Similar to FIG. 4 the interstitial space between the schematic circle-shaped plants P is used most efficiently in this ideal arrangement. In FIG. 4 the growing circle plants P are arranged following a spiral path—in FIG. 10 the growing circle plants P are arranged in concentric circles that provide as a system that is easily scalable.

Figure 11:
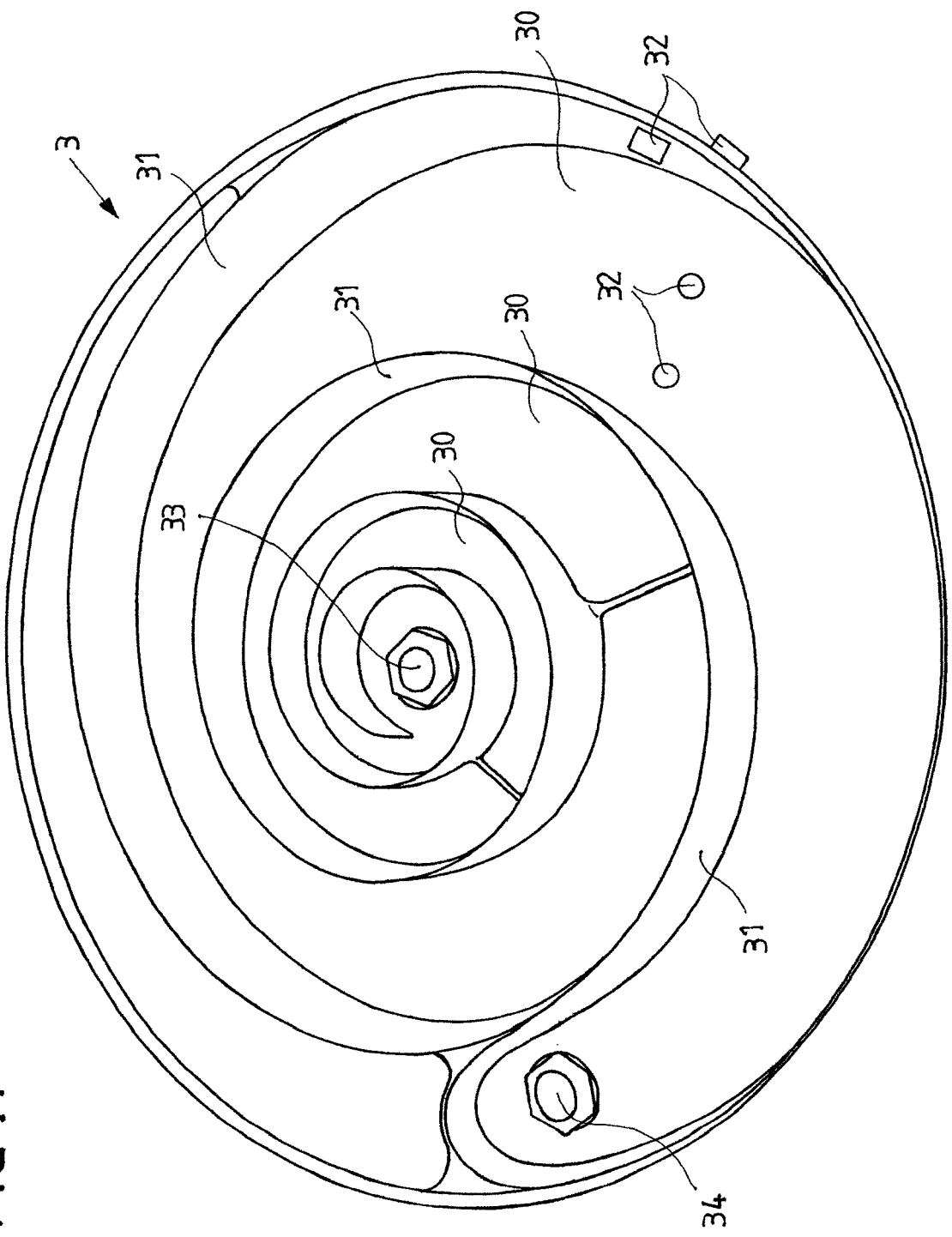
FIG. 11 perspective view of a container 3 to receive plant roots in a hydroponic and/or aeroponic environment.

FIG. 11 shows a perspective view of a container 3 to receive plant roots in a hydroponic and/or aeroponic environment. Above of this container the first guidance panel 1 and the further guidance panel 2 (not shown in FIG. 11) of the first principle shown in FIGS. 1 and 2 are arranged. The container 3 may in the easiest case just be a simple vessel that is capable of holding enough liquids like water for a hydroponic system or vapor for a aeroponic system. In this figure the container 3 is more complex showing a channel structure 30 with vertical walls 31. Those walls structurally separate the roots of plants in different growing states being adjacent to each other on their spiral path but being separated by the wall structure. In the middle or the spiral-shaped channels an inlet 33 for liquid or vapor is provided. Near the circumference an outlet 34 for liquid or vapor is provided. From the inlet 33 to the outlet 34 the bottom of the channel structure 30 is showing an incline. In particular for preferred hydroponic systems water is driven from the inlet 33 down by gravity along the spiral path to the outlet 34. On the way a control sensor device 32 is provided to monitor and control significant parameters like for example temperature, pH-value, fertilizer concentration, water level etc.

Figure 12:
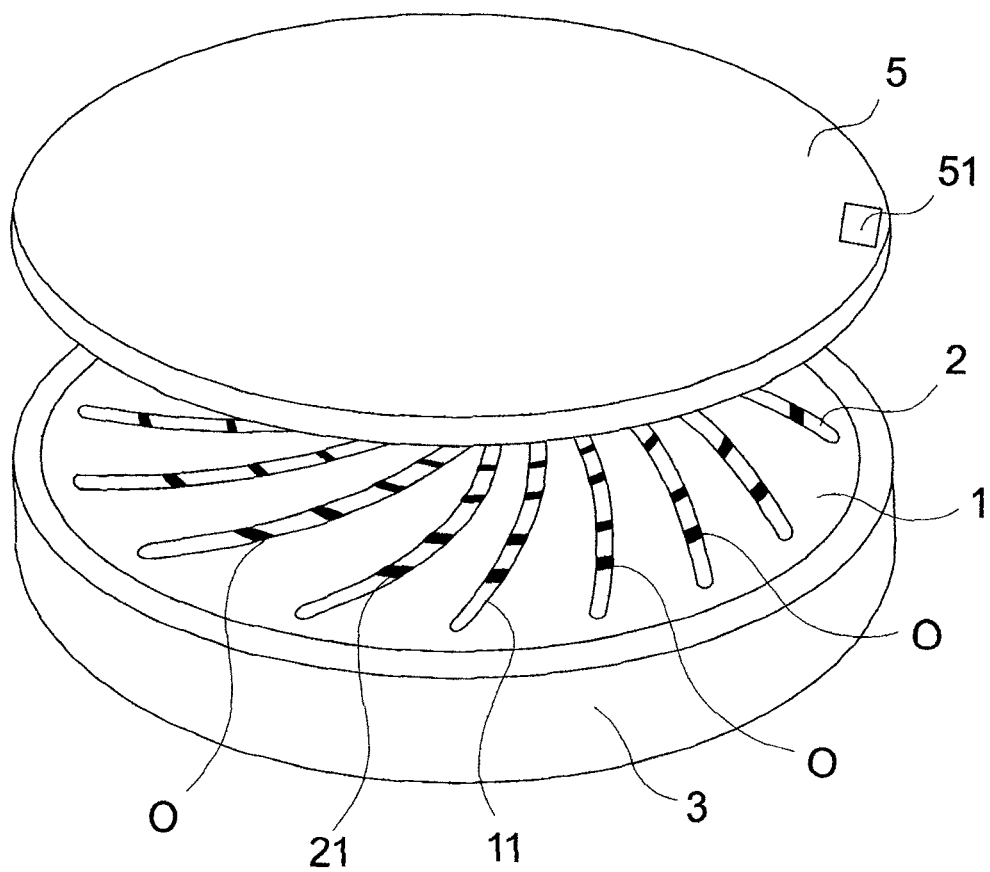
FIG. 12 perspective view of schematic representation of the plant grow system comprising a horticultural illuminating device 5.

FIG. 12 shows a perspective view of a schematic representation of the plant grow system comprising a horticultural illumination device 5. The illumination device 5 is placed above a container 3 that is covered by the further guidance panel 2 and the first guidance panel 1 of the first principle. Such a system can be arranged in a rack and would therefore be vertically stackable.

Figure 13:
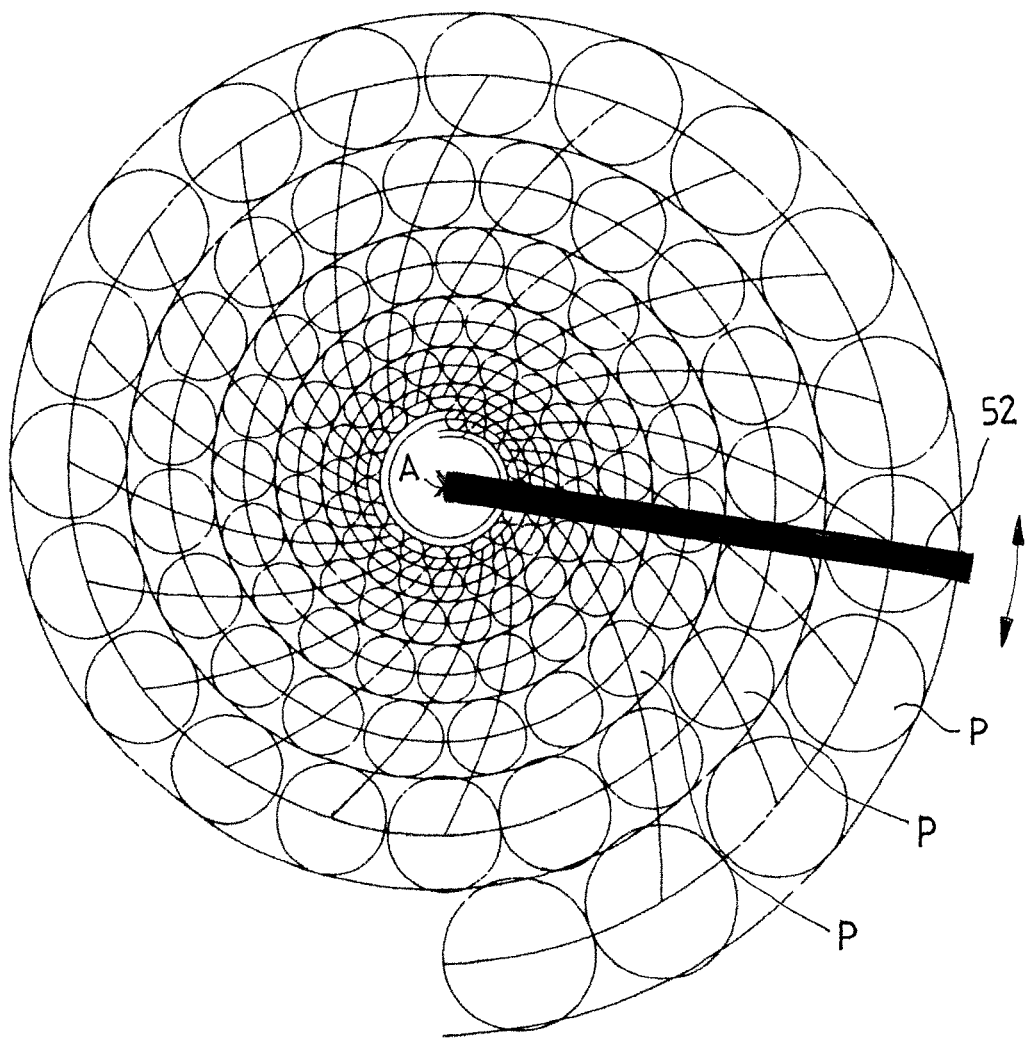
FIG. 13 schematic top view on plants arranged according to the first principle of the invention comprising a moveable light source

FIG. 13 shows a schematic top view on plants P arranged according to the first principle of the invention with a movable light source 52. The movable light source 52 is a linear light source extending radially outward from the rotation axis A. Rotating the light source 52 it may be positioned much closer to the plants even touching the plants P during rotation. Due to the shorter distance the yield of absorbed photons is higher compared to a static light source that must cover all plants of different sizes at all times.

REFERENCE NUMBERS 1 first guidance panel
10 first guidance panel center
11 first guidance panel slots
12 drive structure
2 further guidance panel
20 further guidance panel center
21 further guidance panel slots
22
3 container
30 channel structure
31 channel walls
32 control sensor device
33 inlet
34 outlet
4 driving member
5 horticultural illumination device
51 dimming device
52 movable light source
A rotation axis
0 plant openings
01 spiral-adjacent plant openings/circle-adjacent plant openings
02 radial-adjacent plant openings
α plant opening angle

The invention claimed is:

1. A plant growing system for moving growing plants, the plant growing system comprising:
   a first guidance panel having a first guidance panel center and first guidance panel slots extending within said first guidance panel from an area adjacent to the first guidance panel center in a radially-outward direction,
   a further guidance panel with a further guidance panel center and a further guidance panel slot providing a guiding track for the growing plants,
   wherein said first guidance panel with said first guidance panel center and said further guidance panel with said further guidance panel center are coaxially arranged and positioned on top of each other to allow for a rotational movement between each other around a common rotation axis, wherein plant openings are formed at intersections of said first guidance panel slots with said further guidance panel slot, wherein:
   said plant openings are distributed in a spiral pattern around said rotation axis wherein said plant openings define a plurality of pairs of adjacent plant openings, each pair of the plurality of pairs of adjacent plant openings including a first plant opening and a second plant opening, the first plant opening defined at least in part by a first slot of said first guidance panel slots, and the second plant opening defined at least in part by a second slot of said first guidance panel, the first slot being adjacent to the second slot, and each pair of the plurality of pairs of adjacent plant openings defines a plant-opening angle with respect to said rotation axis, and
   said first guidance panel slots and said further guidance panel slots are curved such that between said pairs of adjacent plant openings another plant opening is located in a radially-outward direction on a line that deviates by a deviation angle from a bisecting line of said plant's opening angle, said deviation angle is less than 10°.

2. The plant growing system according to claim 1, wherein each of said first guidance panel slots defines a first curvature, and
said further guidance panel slots are formed in a continuous spiral shape.

3. The plant growing system according to claim 2, wherein a curvature of said continuous spiral shape is based upon a plant growth cycle.

4. The plant growing system according to claim 2, wherein a majority of said first curvatures of said first guidance panel slots are identical.

5. The plant growing system according to claim 4, wherein all of said first curvatures of said first curvatures of said first guidance panel slots are identical.

6. The plant growing system according to claim 1, wherein a majority of the plant opening angles of the pairs of adjacent plant openings have the same magnitude.

7. The plant growing system according to claim 6, wherein all of said plant opening angles of the pairs of adjacent plant openings have the same magnitude.

8. The plant growing system according to claim 1, wherein said first guidance panel and said further guidance panel are arranged in a detachable manner.

9. The plant growing system according to claim 1, wherein said first guidance panel is formed in a disc shape that is arranged and adapted to rotate around said rotation axis, wherein said further guidance panel is fastened in relation to said rotation axis.

10. The plant growing system according to claim 9, wherein said first guidance panel has a disc circumference with a drive structure being arranged along said disc circumference and being adapted to be engaged by a driving member to rotate said first guidance panel around said rotation axis.

11. The plant growing system according to claim 1, wherein said first guidance panel and said further guidance panel are arranged on top of a container, said container being adapted to accommodate plant roots that are controlled by said plant growing system and adapted to provide said plant roots with plant nutrients and/or water.

12. The plant growing system according to claim 11, wherein said container comprises a hydroponic and/or aeroponic plant growing device.

13. The plant growing system according to claim 11, wherein said container includes a spiral channel structure with channel walls starting from a center area of said channel structure.

14. The plant growing system according to claim 13, wherein said channel structure includes an incline going upwards in a direction towards said center area of said channel structure.

15. The plant growing system according to claim 11, wherein said container comprises a control sensor device that is adapted to detect parameters from the group consisting of temperature inside and outside said container, pH-value, plant fertilizer concentration and water level.

16. The plant growing system according to claim 15, wherein said control sensor device is adapted to control said temperature inside said container, said pH-value, said plant fertilizer concentration and said water level.

17. The plant growing system according to claim 1, wherein the system comprises a horticultural lighting device for illumination of said plants arranged above said first guidance panel.

18. The plant growing system according to claim 17, wherein said lighting device comprises a dimming device to reduce said illumination depending on the amount of solar light reaching the plant growing system.

19. The plant growing system according to claim 17, wherein said lighting device comprises a movable light source arranged and adapted to rotate around said rotation axis.

20. The plant growing system according to claim 1, wherein said deviation angle is less than 8°.

21. The plant growing system according to claim 1, wherein said deviation angle is less than 6°.

22. The plant growing system according to claim 1, wherein said deviation angle is 0°.

23. The plant growing system according to claim 1, wherein each of said first guidance panel slots defines a first curvature, and each of said further guidance panel slots are formed as curved slots, each curved slot defining a further curvature that extends within said further guidance panel from an area adjacent to the further guidance panel center in a radially-outward direction, wherein said each further curvature is opposite to said first curvature of said first guidance panel slots.

24. The plant growing system according to claim 23, wherein a shape of one of said first guidance panel slots is mirror symmetric to a shape of one of said further guidance panel slots.

25. The plant growing system according to claim 23, wherein a majority of said further curvatures of said further guidance panel slots are identical.

26. The plant growing system according to claim 23, wherein said first curvature and said further curvature are based upon a plant growth cycle.

27. The plant growing system according to claim 23, wherein a majority of said first curvatures of said first guidance panel slots are identical.

28. The plant growing system according to claim 27, wherein all of said first curvatures of said first guidance panel slots are identical.

29. A plant growing system for moving growing plants, the plant growing system comprising:
a first guidance panel having a first guidance panel center and first guidance panel slots extending within said first guidance panel from an area adjacent to the first guidance panel center in a radially-outward direction,
a further guidance panel with a further guidance panel center and further guidance panel slots providing guiding tracks for the growing plants,
wherein said first guidance panel with said first guidance panel center and said further guidance panel with said further guidance panel center are coaxially arranged and positioned on top of each other to allow for a rotational movement between each other around a common rotation axis, wherein plant openings are formed at intersections of said first guidance panel slots with said further guidance panel slots, wherein:
said plant openings are distributed in several circular patterns coaxial to said rotation axis, wherein on a same circular pattern, said plant openings define a plurality of pairs of adjacent plant openings, each pair of the plurality of pairs of adjacent plant openings including a first plant opening and a second plant opening, the first plant opening defined at least in part by a first slot of said first guidance panel slots, and the second plant opening defined at least in part by a second slot of said first guidance panel, the first slot being adjacent to the second slot, and each pair of the plurality of pairs of adjacent plant openings defines a plant-opening angle with respect to said rotation axis, and said first guidance panel slots and said further guidance panel slots are curved such that between said pairs adjacent plant openings a plant opening is located in a radially-outward direction on a line that deviates from a bisecting line of said plant's opening angle, said deviation angle is less than 10.

30. The plant growing system according to claim 29, wherein a majority of the plant opening angles of the pairs of adjacent plant openings have the same magnitude.

31. The plant growing system according to claim 30, wherein all of the plant opening angles of the pairs of adjacent plant openings have the same magnitude.

32. The plant growing system according to claim 29, wherein said first guidance panel and said further guidance panel are arranged in a detachable manner.

33. The plant growing system according to claim 29, wherein said first guidance panel is formed in a disc shape that is arranged and adapted to rotate around said rotation axis, wherein said further guidance panel is fastened in relation to said rotation axis.

34. The plant growing system according to claim 33, wherein said first guidance panel has a disc circumference with a drive structure being arranged along said disc circumference and being adapted to be engaged by a driving member to rotate said first guidance panel around said rotation axis.

35. The plant growing system according to claim 29, wherein said first guidance panel and said further guidance panel are arranged on top of a container, said container being adapted to accommodate plant roots that are controlled by said plant growing system and adapted to provide said plant roots with plant nutrients and/or water.

36. The plant growing system according to claim 35, wherein said container comprises a hydroponic and/or aeroponic plant growing device.

37. The plant growing system according to claim 35, wherein said container includes a channel structure with several curved channels extending from a center area of said channel structure in a radially-outward direction and being separated from each other by channel walls.

38. The plant growing system according to claim 37, wherein said channel structure includes an incline going upwards in a direction towards said center area of said channel structure.

39. The plant growing system according to claim 35, wherein said container comprises a control sensor device that is adapted to detect parameters from the group consisting of temperature inside and outside said container, pH-value, plant fertilizer concentration and water level.

40. The plant growing system according to claim 39, wherein said control sensor device adapted to control said temperature inside said container, said pH-value, said plant fertilizer concentration and said water level.

41. The plant growing system according to claim 29, wherein the system comprises a horticultural lighting device for illumination of said plants arranged above said first guidance panel.

42. The plant growing system according to claim 41, wherein said lighting device comprises a dimming device to reduce said illumination depending on the amount of solar light reaching the plant growing system.

43. The plant growing system according to claim 41, wherein said lighting device comprises a movable light source arranged and adapted to rotate around said rotation axis.

44. The plant growing system according to claim 29, wherein said deviation angle is less than 8°.

45. The plant growing system according to claim 29, wherein said deviation angle is less than 6°.

46. The plant growing system according to claim 29, wherein said deviation angle is 0°.

* * * * *

UNITED STATES PATENT AND TRADEMARK OFFICE
CERTIFICATE OF CORRECTION

PATENT NO.       : 10,506,770 B2
APPLICATION NO.  : 15/502189
DATED            : December 17, 2019
INVENTOR(S)      : Guy Galonska and Erez Galonska It is certified that error appears in the above-identified patent and that said Letters Patent is hereby corrected as shown below:

In the Specification

In Column 2, Line 59, delete "(e.g." and insert -- (e.g., --, therefor.

In Column 5, Line 30, delete "source" and insert -- source. --, therefor.

In Column 6, Line 16, delete "the a" and insert -- a --, therefor.

Signed and Sealed this
Seventeenth Day of March, 2020

Andrei Iancu
*Director of the United States Patent and Trademark Office*